(12) United States Patent
Kim

(10) Patent No.: US 9,369,034 B2
(45) Date of Patent: Jun. 14, 2016

(54) SWITCHING POWER SUPPLY CIRCUIT USING SWITCHING DEVICES AND SWITCHING CONTROLLER

(75) Inventor: Ui Jong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 171 days.

(21) Appl. No.: 14/344,575

(22) PCT Filed: Sep. 12, 2012

(86) PCT No.: PCT/KR2012/007325
§ 371 (c)(1),
(2), (4) Date: Mar. 12, 2014

(87) PCT Pub. No.: WO2013/039328
PCT Pub. Date: Mar. 21, 2013

(65) Prior Publication Data
US 2015/0043247 A1  Feb. 12, 2015

(30) Foreign Application Priority Data

Sep. 15, 2011 (KR) .................. 10-2011-0092867

(51) Int. Cl.
| H02M 3/335 | (2006.01) |
| H02M 1/08 | (2006.01) |
| H02M 3/337 | (2006.01) |
| H02M 1/00 | (2006.01) |

(52) U.S. Cl.
CPC .............. *H02M 1/08* (2013.01); *H02M 3/3378* (2013.01); *H02M 3/33546* (2013.01); *H02M 3/33592* (2013.01); *H02M 2001/0054* (2013.01); *Y02B 70/1475* (2013.01)

(58) Field of Classification Search
CPC ...................... H02M 3/33592; H02M 3/33546
See application file for complete search history.

(56) References Cited

U.S. PATENT DOCUMENTS

| 5,889,339 A * | 3/1999 | Bildgen ............ H02M 7/53803 307/125 |
| 6,445,597 B1 | 9/2002 | Boylan et al. |

(Continued)

FOREIGN PATENT DOCUMENTS

| JP | 10-174431 A | 6/1998 |
| JP | 2000-184706 A | 6/2000 |
| JP | 2007-236058 A | 9/2007 |

OTHER PUBLICATIONS

European Search Report for European Patent Application No. 12832678 which corresponds to the above-identified U, S. application.

(Continued)

*Primary Examiner* — Timothy J Dole
*Assistant Examiner* — Ishrat Jamali
(74) *Attorney, Agent, or Firm* — LRK Patent Law Firm

(57) ABSTRACT

A switching power supply circuit includes a transformer, a switching unit which includes at least one switch and is connected to an output of the transformer, and a switching controller which is connected to an output of the switching unit, is configured to control the switching unit, and includes a comparing unit and an output waveform generating unit. Furthermore, the comparing unit is configured to output a value used to control the output waveform generating unit, and the output waveform generating unit is configured to generate a control signal based on the output value of the comparing unit and output the control signal to the at least one switch of the switching unit. Accordingly, the power consumption is reduced by performing rectification using a switch, and the switching power supply circuit is prepared in a simple configuration since the switching unit is controlled without any controller.

3 Claims, 3 Drawing Sheets

(56) References Cited

U.S. PATENT DOCUMENTS

| | | |
|---|---|---|
| 6,504,739 B2 | 1/2003 | Phadke |
| 7,173,835 B1 | 2/2007 | Yang |
| 2007/0097717 A1 | 5/2007 | Hsu et al. |
| 2007/0201253 A1 | 8/2007 | Endo et al. |
| 2011/0075464 A1 | 3/2011 | Sato |
| 2011/0175584 A1* | 7/2011 | Huber .................. H02M 3/158 323/282 |

OTHER PUBLICATIONS

International Search Report for International Application No. PCT/KR2012/007325.

Bor-Ren Lin et al., "Analysis of the Two-Switch Forward Converter with Synchronous Current Doubler Rectifier", IEEE ICIEA, 23-25, May 2007.

KIPO Office Action for Korean Patent Application No. 10-2011-0092867 which corresponds to the above-identified application.

* cited by examiner

SWITCHING POWER SUPPLY CIRCUIT USING SWITCHING DEVICES AND SWITCHING CONTROLLER

TECHNICAL FIELD

The disclosure relates to a switching power supply circuit which may be used for a power transformation.

BACKGROUND ART

FIG. 1 is a circuit diagram showing a general DC-DC converter.

Referring to FIG. 1, the DC-DC converter includes a power supply 10, a transformer 20 and a first rectifier 30.

The power supply 10 may include a direct current source and at least one switch. The energy may be transferred to the first rectifier 30 through the transformer 20 by turning on/off the switch on time.

The first rectifier 30 includes a first diode 32 and a second diode 34. Since a diode makes current to flow in one direction, if the first and second diodes 32 and 34 are disposed as shown in FIG. 1, a voltage input having a square waveform transferred through the transformer 20 can be rectified.

As the power rectified through the first and second diodes 32 and 34 passes through a smoothing coil 36 and a smoothing storage battery 38, ripples are reduced so that amplified DC power may be output. The output voltage is held between both terminals of the smoothing storage battery 38.

Although the DC-DC converter using the diode has a simple structure, when high current flows through the diode, the energy loss resulting from the product of the current and voltage drop of the diode may be increased.

DISCLOSURE OF INVENTION

Technical Problem

The embodiment provides a switching power supply circuit which can reduce power consumption caused in a rectifier by using a plurality of switching devices instead of a diode for the rectifier of a DC-DC converter.

Further, the embodiment provides a switching power supply circuit which includes a switching controller for controlling a plurality of switching devices based on outputs of the switching power supply circuit without any specific controller.

Solution to Problem

A switching power supply circuit includes a transformer, a switching unit which includes at least one switch and is connected to an output of the transformer, and a switching controller which is connected to an output of the switching unit, is configured to control the switching unit, and includes a comparing unit and an output waveform generating unit. The comparing unit is configured to output a value used to control the output waveform generating unit, and the output waveform generating unit is configured to generate a control signal based on the output value of the comparing unit and output the control signal to the at least one switch of the switching unit.

Advantageous Effects of Invention

According to the embodiment, power consumption may be reduced by performing a current rectification using a switch, and the switching unit may be controlled without any specific controller so that the switching power supply circuit may be implemented with a simpler configuration.

BEST MODE FOR CARRYING OUT THE INVENTION

Figure 1:
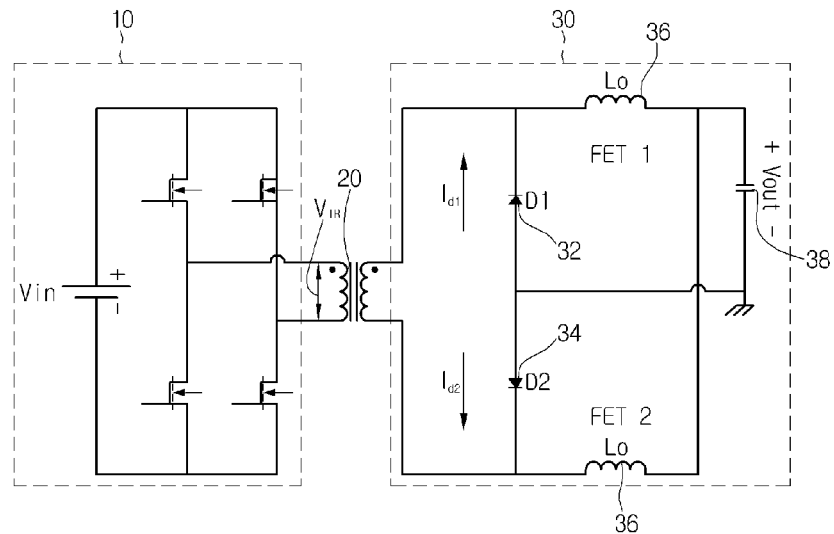
FIG. 1 is a circuit diagram showing a general DC-DC converter.

Hereinafter, the embodiments will be described in detail with reference to accompanying drawings. Such a position of the elements has been described with reference to the drawings. The size of each element shown in the drawings may be exaggerated for the purpose of convenience or clarity. In addition, the size of elements does not utterly reflect an actual size.

Figure 2:
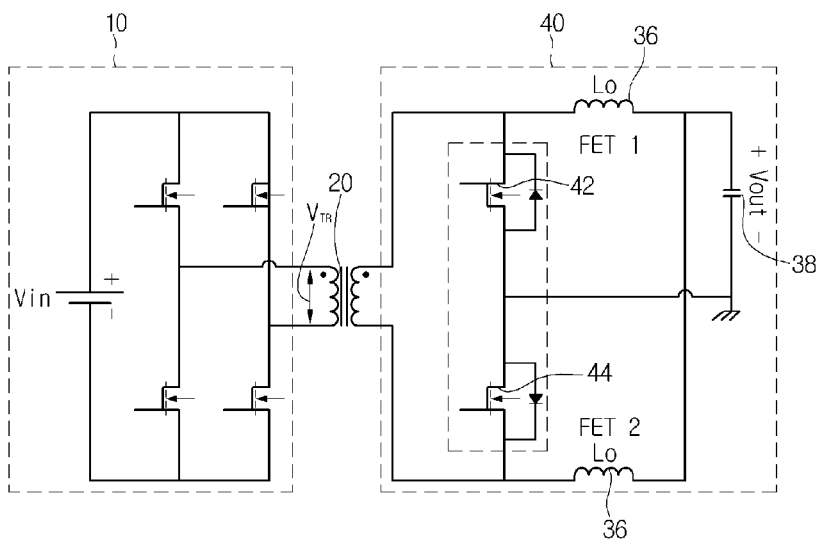
FIG. 2 is a circuit diagram of a DC-DC converter according to an embodiment.
Figure 3:
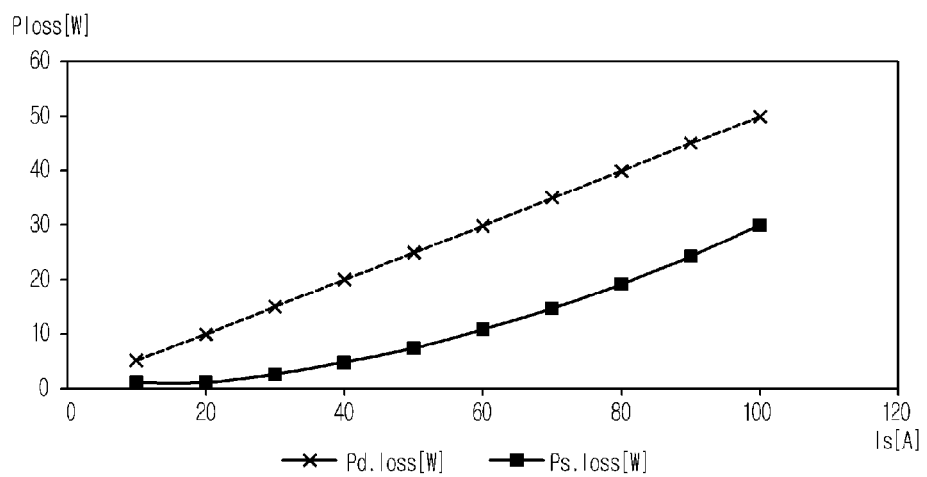
FIG. 3 is a graph showing power loss according to a current flowing through a rectifier when using the circuit depicted in FIGS. 1 and 2.

FIG. 2 is a circuit diagram of a DC-DC converter according to an embodiment, and FIG. 3 is a graph showing power loss according to a current flowing through a rectifier when using the circuit depicted in FIGS. 1 and 2.

Referring to FIGS. 1 to 3, the DC-DC converter includes a power supply 10, a transformer 20 and a second rectifier 40.

The power supply 10 may include a DC source and a plurality of switching devices. The power supply 10 controls the switching devices to apply a voltage of $V_{TR}$ to the transformer 20. As the transformer 20 is used, the power supply 10 and the second rectifier 40 are electrically separated from each other.

By controlling a winding ratio of the transformer 20, the voltage amplifying ratio between the power supply and the second rectifier 40 may be determined.

The transformer 20 transfers the electric power transferred from the power supply 10 to the second rectifier 40. The second rectifier 40 may include a first FET (Field-effect transistor) 42 and a second FET 44. By controlling the gate voltages of the first and second FETs 42 and 44, the first and second FET 42 and 44 may be short/open.

By controlling the FET1 42 and the FET2 44 according to the state of the $V_{TR}$, a rectifying effect which is the same as that of a diode rectifier may be obtained. The method of controlling the FET1 and the FET2 will be described later.

FIG. 3 is a graph showing the powers consumed according to the currents flowing through the circuits depicted in FIGS. 1 and 3.

The transverse axis of the graph denotes an amount of a current which flows through the rectifier, and the longitudinal axis of the graph denotes a power which is consumed when the current flows through the rectifier.

The Pd.loss denotes a power consumed when a current flows through a diode. In the diode, the dropped voltage is constant regardless the intensity of the current. Thus, the consumed power is linearly increased according to the current increase. It is assumed in the graph that the dropped voltage is 0.5V.

The Ps.loss denotes power loss in a switching rectifier scheme using an FET. Since the FET has a predetermined conductive resistance, the power loss is increased proportionally to the square of the current as the large current flows through the FET. However, since a conductive resistance of an FET is about several mΩ, the switching rectifier scheme using the FET has a merit that the power loss may be reduced, compared with a rectifier scheme using a diode.

It is assumed in the graph of the embodiment that the conductive resistance of the FET is 3 mΩ.

As shown in the graph of the embodiment, when the current of 100 A flows, the power loss is 50 W in case of a diode and 30 W in case of a FET. Thus, it is understood that the power consumed with the FET is less than the power consumed with the diode when commercially rectifying a large current.

Figure 4:
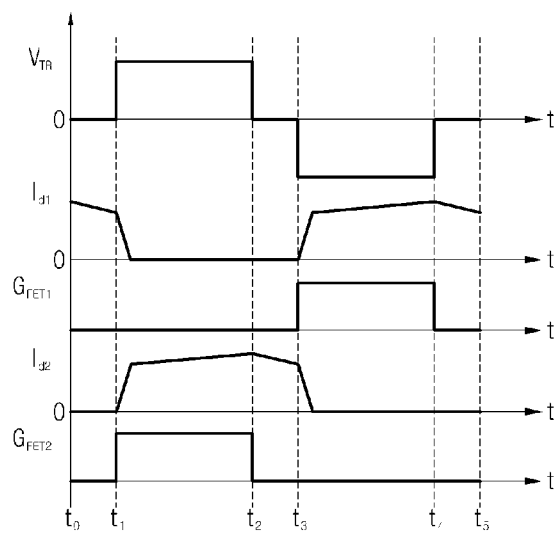
FIG. 4 is a view showing currents flowing through a first diode and a second diode depicted in FIG. 1 and gate waveforms for switching FET 1 and FET2 depicted in FIG. 2.

FIG. 4 is a view showing currents flowing through the first diode 32 and the second diode 34 depicted in FIG. 1 and gate waveforms for switching FET 1 42 and FET2 44 depicted in FIG. 2.

Referring to FIG. 4, as $V_{TR}$ is the output of the transformer 20, the power is not transferred by the switching operation of the power supply 10 for the intervals of t0~t1, t2~t3 and t4~t5 which may be called freewheeling intervals.

Since the diode allows current to flow in only one direction due to the device characteristic, it may be determined whether the current flows through the first diode 32 or the second diode 34 according to the direction of $V_{TR}$.

In the embodiment, energy may be transferred through the second diode 34 for the interval of t1~t2, and the first diode 32 for the interval of t3~t4.

In case of using the FET, when a gate voltage is high, the FET is turned on. In the embodiment, the FET2 is turned on for the interval of t1~t2 so that the FET2 may transfer a power, and the FET1 is turned on for the interval of t3~t4 so that the FET1 may transfer a power.

During the freewheeling intervals, the FET1 and FET2 are allowed to be turned on or off, and the freewheeling intervals may be freely determined according to control methods.

By controlling the gate voltages of the FET1 and the FET2, the DC-DC converter which has small power consumption may be implemented.

Figure 5:
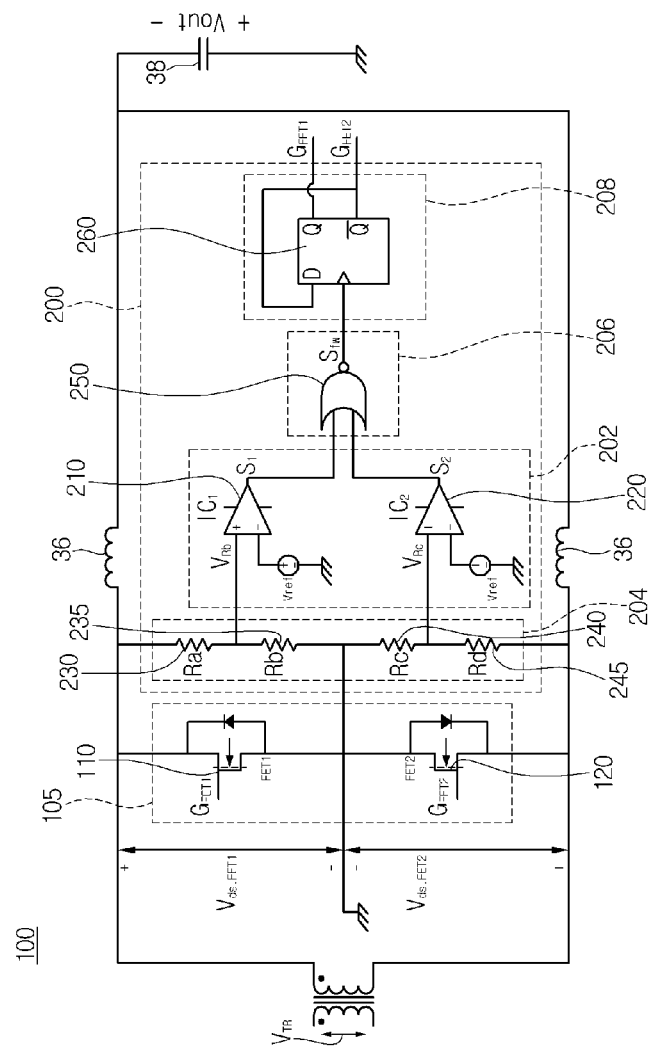
FIG. 5 is a circuit diagram of a rectifier according to another embodiment.

FIG. 5 is a circuit diagram of the rectifier according to another embodiment.

The rectifier according to another embodiment will be called a third rectifier 100 for the purpose of explanation.

Referring to FIG. 5, the third rectifier 100 may be connected to the transformer 20 of transferring power to the power supply 10.

The third rectifier 100 may include a switching unit 105 including a plurality of switches and a switching controller 200 connected to the switching unit 105.

The switching unit 105 may include one switch or more and the switch includes FETs in the embodiment. The switching controller 200 includes a first switch 110 and a second switch 120.

The first and second switches 110 and 120 may be turned on/off according to the gate voltages. The gate voltages may be controlled by the switching controller 200.

When the first switch 110 is turned off, the voltage applied to the first switch 110 may be called Vds_FET1. When the second switch 120 is turned off, the voltage applied to the second switch 120 may be called Vds_FET2.

The first and second switches 110 and 120 may be controlled such that the first and second switched 110 and 120 are turned on/off in response to the timing of the voltage $V_{TR}$ transferred through the transformer 20, such that the third rectifier 100 may output a rectified DC power.

The switching controller 200 may include a resistance unit 204 which may be connected to the output terminals of the switching unit 105, a comparing unit 202 which is connected to the resistance unit 204, a clock generating unit 206 for generating a clock value based on an output of the comparing unit 202, and a waveform generating unit 208 which can generate a gate waveform through the output of the clock generating unit 206.

The outputs of the waveform generating unit 208 are input to the gates of the switches of the switching unit 105 as the gate voltage values, such that the switching unit 105 may be controlled.

The resistance unit 204 may include one resistor or more.

The resistance unit 204 may include a first resistor 230 and a second resistor 235 which are connected in parallel to the first switch 110 and a third resistor 240 and a fourth resistor 245 which are connected in parallel to the second switch 120.

In the embodiment, it may be assumed that the resistance values of the first to fourth resistors 230 to 245 are Ra, Rb, Rc and Rd.

The voltage value of Vds_FET1 applied to the first switch 110 is applied to the first and second resistors 230 and 235, and the Vds_FET1 is divided by the first and second resistors 230 and 235.

Further, The voltage value of Vds_FET2 applied to the second switch 120 is applied to the third and fourth resistors 240 and 245, and the voltage of Vds_FET2 is divided by the ratio of Rc to Rd.

The comparing unit 202 may include a plurality of comparators. In the embodiment, the comparing unit 202 includes a first comparator 210 and a second comparator 220.

When a voltage value which is equal to or higher than a first reference voltage is input, the first comparator 210 may output a logic high value, and when a voltage value which is equal to or higher than a second reference voltage is input, the second comparator 220 may output a logic high value.

A voltage value between the first resistor 230 and the second resistor 235 may be input to the first comparator 210.

The value of the first reference voltage may be less than the value of (Rb*Vds.FET1)/(Ra+Rb). Since the voltage value applied to the second resistor 235 may vary depending on the effects of temperature variation and a noise of the surroundings, the value of the first reference voltage may be controlled by taking the variation of the value into consideration. Preferably, the value of the first reference voltage may be obtained by (Rb*Vds.FET1)/(2*(Ra+Rb)).

Thus, when the voltage value which is equal to or higher than the first reference voltage is applied to the second resistor 235, the first comparator 210 may output a logic high value.

The voltage value between the third resistor 240 and the second resistor 245 may be input to the second comparator 220.

The value of the second reference voltage may be less than the value of (Rc*Vds.FET2)/(Rc+Rd). Since the voltage value applied to the third resistor 240 may vary depending on the effects of temperature variation and a noise of the surroundings, the value of the second reference voltage may be controlled by taking the variation of the value into consideration. Preferably, the value of the second reference voltage may be obtained by (Rc*Vds.FET2)/(2*(Rc+Rd)).

Thus, when the voltage value which is equal to or higher than the second reference voltage is applied to the third resistor 240, the second comparator 220 may output a logic high value.

According to the embodiment, the resistance value of the first resistor 230 may be equal to that of the fourth resistor 245, the resistance value of the second resistor 235 may be equal to that of the third resistor 240, and the value of the first reference voltage may be equal to that of the second reference voltage.

The clock generating unit 206 may include a NOR gate 250. The output values of the first and second comparators 210 and 220 may be input to the NOR gate 250.

Thus, when the output values of the first and second comparators 210 and 220 are all a logic low value, the NOR gate 250 outputs a logic high value, and when different input values are input to the NOR gate 250, the NOR gate 250 outputs a logic low value.

The output value of the NOR gate 250 may be input to the waveform generating unit 208 as a clock value.

The waveform generating unit 208 may include a D flip-flop 260. The output value of the NOR gate may be input to the D flip-flop 260 as the clock input.

In the embodiment, the inverted output terminal of the D flip-flop 260 may be connected to the input terminal of the D flip-flop 260, and the inverted output of the D flip-flop 260 may control the second switch 120.

Further, the non-inverted output of the D flip-flop (hereinafter, the same) 260 may control the first switch 110.

In the embodiment, since the first and second switches 110 and 120 are implemented with FETs, when the output of the D flip-flop is a logic high, the first switch 110 may be shorted, and when the output of the D flip-flop is a logic low, the first switch 110 may be open.

Further, when inverted output of the D flip-flop is a logic high, the second switch 120 is shorted, and when the inverted output of the D flip-flop is a logic low, the second switch 120 is open.

Thus, since the switching controller 200 is provided, the switching unit 105 may be controlled based on only the output value of the switching unit 105. Accordingly, the embodiment has merits that the design is simplified and the energy consumption is reduced.

Figure 6:
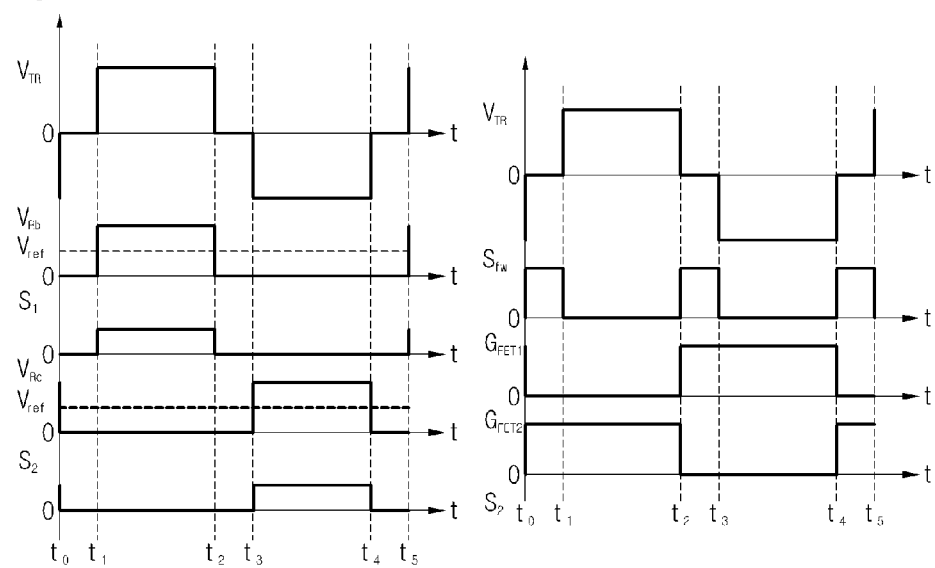
FIG. 6 is a view showing waveforms of the DC-DC converter depicted in FIG. 5 according to an embodiment.

FIG. 6 is a view showing voltage waveforms of the DC-DC converter in FIG. 5 according to the embodiment.

Referring to FIG. 6, a first interval is called the interval of t0~t1, a second interval is called the interval of t1~t2, a third interval is called the interval of t2~t3, a fourth interval is called the interval of t3~t4, and the fifth interval is called the interval of t4~t5.

In the FIG. 6, the first to third intervals are freewheeling intervals in which the value of $V_T$ is 0 (zero). Thus, the first and second switches 110 and 120 are shorted or open during the first to third intervals.

Since the voltage of VRb is applied to the second resistor 235 (resistance unit 204) during the second interval and is higher than the first reference voltage, the output value S1 of the first comparator 210 may be a logic high value. Further, since the voltage value applied to the third resistor 240 (resistance unit 204) is 0 (zero), the output value S2 of the second comparator 220 may be a logic low value.

Since the voltage value applied to the second resistor 235 (resistance unit 204) is 0 (zero) during the fourth interval, the output value S1 of the first comparator 210 may be a logic low value. Further, since the voltage value of VRc is applied to the third resistor 240 (resistance unit 204) and is higher than the second reference voltage, the output value S2 of the second comparator 220 may be a logic high value.

The output value Sfw of the NOR gate 250, to which the output values of the first and second comparators 210 and 220 are input, may be a logic high value during the first, third and fifth intervals for which both input values of the NOR gate 250 are a logic low value.

Hereinafter, the non-inverted output value GFET1 and the inverted output value GFET2 of the D flip-flop will be described.

The inverted output value of the D flip-flop is fed back to the D flip-flop as the input value of the D flip-flop, and the output value of the NOR gate 250 is input to the D flip-flop as the clock value.

Thus, the D flip-flop may output a logic low value during the first, second and fifth intervals, and may output a logic high value during the third and fourth intervals.

Further, the inverted output value of the D flip-flop may be a logic low value during the third and fourth intervals, and may be a logic high value during the first, second and fifth intervals.

Thus, the first switch 110 may be shorted during the third and fourth intervals and may be open during the first, second and fifth intervals. The second switch 120 may be shorted during the first, second and fifth intervals and may be open during the third and fourth intervals.

When the voltage input value to the second comparator 220 is equal to or higher than the second reference voltage, the second comparator 220 may output a logic high value.

In the drawings, the voltage input value to the first comparator 210 is denoted as $V_{Rb}$, the voltage input value to the second comparator 220 is denoted as $V_{Rc}$, and the values of the first and second reference voltages are equally denoted as $V_{ref}$.

The output value of the NOR gate 250, which receives the output values of the first and second comparators 210 and 220 as the input values, may be denoted as $S_{fw}$. The NOR gate 250 outputs a logic high value during the first, third and fifth intervals which are the freewheeling interval.

The NOR gate 250 may be connected to the waveform generating unit 208. In the embodiment, the output of the NOR gate 250 may be input to the clock input terminal of the D flip-flop. Thus, the output of the D flip-flop may be varied at the time point at which the freewheeling interval starts.

In the embodiment, the value of GFET1, by which the first switch 110 is controlled, is changed to the logic low value at t0 and the low value is maintained, and then, changed to the logic high value at t2 and the high value is maintained until the value is changed to the logic low value at t4.

Further, in the embodiment, the value of GFET2, by which the second switch 120 is controlled, is changed to the logic low value at t2 and the low value is maintained, and then, changed to the logic high value at t2 and the high value is maintained until the value is changed to the logic high value at t4.

As described above, as the resistance unit 204, the comparing unit 202, the clock generating unit 206 and the waveform generating unit 208 are connected with each other, the on/off operations of the first and second switches 110 and 120 of the switching unit 105 may be controlled based on only the output of the switching unit 105.

The embodiment has a merit that the power consumption caused by the current flowing through a parasitic diode can be prevented by shorting the first switch 110 at t2 where the freewheeling interval starts.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A switching power supply circuit comprising:

a transformer;

a switching unit which includes a first switch and a second switch; and a switching controller which includes a comparing unit and an output waveform generating unit and is configured to control the switching unit, wherein the first switch is configured to switch between one end of the output of the transformer and a ground, and the second switch is configured to switch between an opposite end of the output of the transformer and the ground, wherein the comparing unit is configured to output a control signal to the output waveform generating unit, and include a first comparator having an input terminal connected to an output terminal of the first switch, and a second comparator having an input terminal connected to an output terminal of the second switch, wherein the output waveform generating unit includes a NOR gate for receiving an output of the comparing unit as an input thereof and is configured to output a control signal to the switching unit, and wherein the output waveform generating unit further includes a D flip-flop, and an output of the NOR gate is input to a clock input terminal of the D flip-flop.

2. The switching power supply circuit of claim 1, wherein an inverted output of the D flip-flop is connected to an input terminal of the D flip-flop, a non-inverted output of the D flip-flop controls the first switch, and the inverted output of the D flip-flop controls the second switch.

3. The switching power supply circuit of claim 2, wherein the first switch is shorted when a control input is a logic high, and the second switch is shorted when a control input is a logic high.

* * * * *